Figure 1:
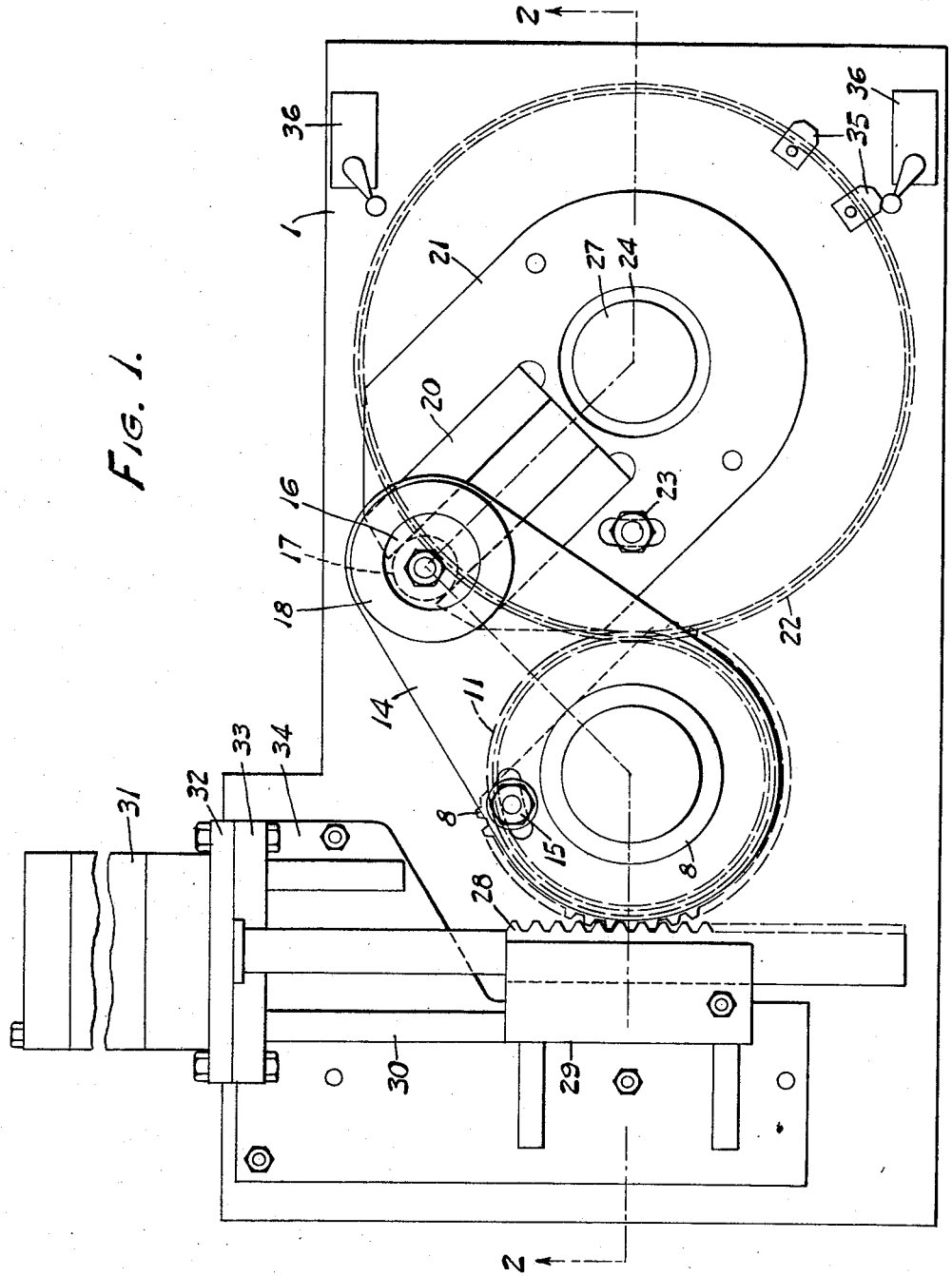

Nov. 23, 1965  C. F. CAFOLLA  3,218,891

INDEX MECHANISM

Filed June 7, 1963  2 Sheets-Sheet 1

INVENTOR.
CONSTANTINE F. CAFOLLA
BY
Christel & Bean
ATTORNEYS

INVENTOR.
CONSTANTINE F. CAFOLLA
BY
Christel + Bean
ATTORNEYS

United States Patent Office 3,218,891
Patented Nov. 23, 1965

3,218,891
INDEX MECHANISM
Constantine F. Cafolla, Waterloo, N.Y., assignor to
Seneca Falls Machine Company, Seneca Falls, N.Y.
Filed June 7, 1963, Ser. No. 286,428
7 Claims. (Cl. 74—817)

This invention relates to a new and useful reciprocating, rotary index mechanism.

The primary object of my invention is to provide a reciprocating index mechanism requiring only two shafts as contrasted with the larger number of shafts normally used.

Another object of my invention is to provide the foregoing in a mechanism multiplying the input actuating motion to provide a larger degree of rotation of the index table.

In one aspect thereof, an index mechanism constructed in accordance with my invention is characterized by the provision of an index arm mounted on the index table column for rotation relative thereto, an index plate mounted for rotation, the index arm having tracking engagement with the index plate for rotating the same, drive gear means connected to the index plate for rotation thereby, driven gear means connected to the index table column for rotating the same, the drive gear means having driving engagement with the driven gear means, and reciprocating drive means for the index arm.

Figure 2:
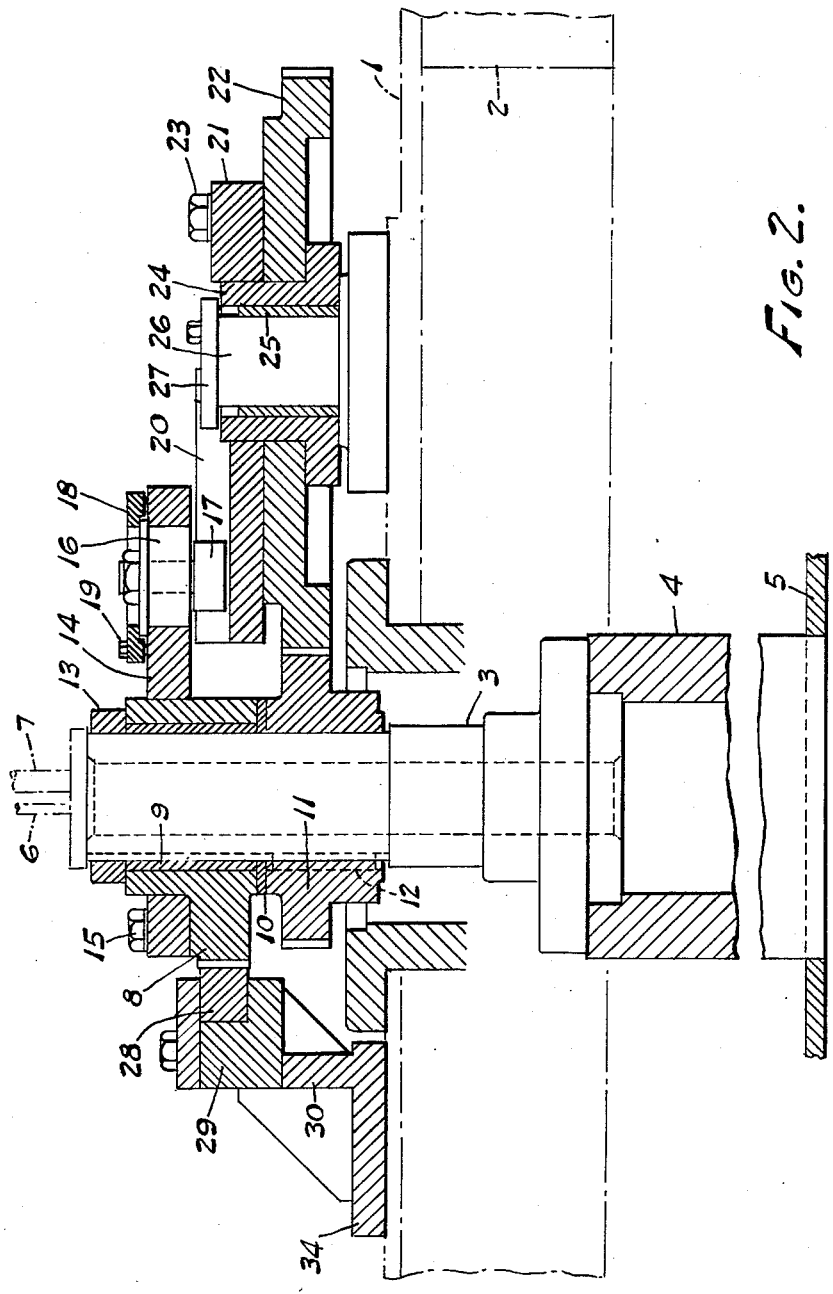

The foregoing and other objects, advantages and characterizing features of the index mechanism of my invention will become clearly apparent from the ensuing detailed description of an illustrative embodiment thereof, considered in conjunction with the accompanying drawing depicting the same wherein like reference numerals denote like parts throughout and wherein:

FIG. 1 is a top plan view of an index mechanism of my invention, the drive motor being broken away for ease of illustration; and FIG. 2 is a vertical sectional view thereof, taken about on line 2—2 of FIG. 1, the machine frame and certain supply lines being shown in phantom and the index column and table being broken away for convenience in illustration.

Referring now in detail to the illustrative embodiment depicted in the accompanying drawings, there is shown the upper part of a machine frame, including a top plate 1 mounted on support columns 2. Top plate 1 has an opening through which passes a stub shaft 3 comprising an extension of the main or center column 4.

Center column 4 mounts on index table 5, and stub shaft 3 and column 4 are hollow, to receive air, oil and electric lines as indicated at 6 and 7.

In accordance with my invention, there is provided a floating gear 8 journaled on main column shaft 3 as by a bearing 9. Gear 8 and bearing 9 are supported on a washer 10 carried by the upper surface of a gear 11 connected to shaft 3 for rotation therewith, as by a key 12. Bearing 9 and gear 8 are held in place by a ring 13.

On index arm 14 is connected to gear 8, as by screws 15, for rotation therewith about shaft 3. At its outer end, arm 14 supports an eccentric bushing 16 journaling a roller 17 and held in adjusted position by a retainer ring 18 clamping the bushing flange against arm 14, as by screws 19.

Roller 17 is reciprocably received in a linear track or channel 20 on an index plate 21 connected to a drive gear 22 as by screws 23. Plate 21 and gear 22 are supported on a flanged sleeve 24 journaled by a bearing 25 for rotation about a second stub shaft or post 26 mounted on the machine frame top plate 1. Gear 22 meshes with gear 11 on center column shaft 3, and the index plate 21 and gear 22 are held in position on sleeve 24 by a retainer plate 27 secured to the upper end of post 26.

Arm 14 and plate 21 are arcuately slotted to receive screws 15 and 23, for positional adjustment relative to gears 8 and 22, respectively.

The floating gear 8 can be rotated by any desired means. In the illustrated embodiment, it meshes with a rack 28 reciprocating in a guide 29 supported on a bracket 30 mounted on the machine top plate 1. Rack 28 is reciprocated by an air cylinder 31 having a mounting flange 32 secured to a plate 33 extending upwardly from base 34 of the bracket 30.

In operation, reciprocation of rack 28 causes reciprocal rotation of gear 8 and index arm 14. Rotation of the latter imparts rotation to index plate 21 and drive gear 22, which latter then rotates gear 11, column 4 and index table 5. Thus, the desired indexing action is achieved with only two shafts, one of them comprising an extension of the main column 4. Gear 22 is larger than gears 8 and 11, whereby a predetermined angular displacement of arm 14 produces a substantially greater angular displacement of center column 4. In the illustrated embodiment, 180° reciprocating indexing is achieved with only 90° rotation of arm 14. Reciprocating of table 5 avoids fouling of lines 6 and 7.

Index dogs 35 are carried by gear 22, for actuating swtiches 36 to control the automatic locking of table 5 in its indexed positions, a preferred mechanism for this purpose being that described in my co-pending application being filed simultaneously herewith, Serial No. 286,900, filed June 7, 1963, entitled, Index Stop and Lock Mechanism.

Accordingly, it is seen that my invention fully accomplishes its intended objects. While I have disclosed and described only a single embodiment, that has been done by way of illustration, it being my intention that the scope of my invention be defined by the appended claims.

Having fully disclosed and completely described my invention, what I claim as new is:

1. An index mechanism comprising, an index table column, an index arm rotatable on said column, reciprocating drive means for said arm, an index plate in tracking engagement with said arm for rotation thereby, drive gear means connected to said plate, and driven gear means connected to said column, said drive gear means having driving connection with said driven gear means for rotating said column upon rotation of said arm.

2. An index mechanism comprising, a main column, first gear means rotatable on said column, reciprocating drive means for said first gear means, an index arm connected to said first gear means for rotation therewith relative to said column, an index plate connected to said arm for rotation thereby, second gear means connected to said index plate for rotation therewith, and third gear means driven by said second gear means and connected to said column for rotating the same.

3. An index mechanism comprising, a main column, a first gear rotatable on said column, reciprocating drive means for rotating said first gear, an index arm connected to said first gear for rotation therewith relative to said column, an index plate in tracking engagement with said arm for rotation thereby about a shaft, a second gear connected to said index plate for rotation therewith, about said shaft, and a third gear driven by said second gear and connected to said column for rotating the same.

4. A reciprocating index mechanism comprising, a center column, a floating gear rotatable on said center column, reciprocating drive means for rotating said floating gear, an index arm connected to said floating gear for rotation therewith relative to said center column, an index plate in tracking engagement with said index arm for rotation thereby, a drive gear connected to said index plate for rotation therewith, and a driven gear engaging said drive gear and connected to said column for rotating the latter.

5. An index mechanism comprising, a main column having a stub shaft extension, an index table carried by said column, first gear means rotatable on said stub shaft, an index arm connected to said first gear means for rotation therewith, an index plate rotatable on another shaft, said index arm having tracking engagement with said index plate for rotation thereof, second gear means connected to said index plate for rotation thereby, third gear means connected to said column for rotation thereof, said second gear means being in driving engagement with said third gear means, and reciprocating drive means for said first gear means.

6. An index mechanism comprising, a main column having a stub shaft extension at one end thereof, an index table carried by said column, a first gear rotatable on said stub shaft, an index arm connected to said first gear for rotation therewith about said stub shaft, an index plate rotatable on another shaft, said index arm having driving engagement with said index plate for rotation thereof, a second gear connected to said index plate for rotation thereby about said other shaft, a third gear connected to said main column for rotation thereof, said second gear being in driving engagement with said third gear, and drive means for rotating said first gear.

7. An index mechanism comprising, a main column having a stub shaft extension at one end thereof, an index table carried by said main column, a first gear rotatable on said stub shaft, an index arm connected to said first gear for rotation therewith, an index plate rotatable on another shaft, said index arm carrying a roller engaging a track on said index plate for rotating the latter about said other shaft, an eccentric bushing mounting said roller on said arm for adjusting the position of said roller and the throw of said arm, a second gear connected to said index plate for rotation thereby about said other shaft, a third gear connected to said main column for rotation thereof, said second gear being in driving engagement with said third gear and being of greater diameter than said third gear for rotating said column through a greater angle than said arm, and reciprocating drive means for rotating said first gear.

References Cited by the Examiner

UNITED STATES PATENTS 2,770,141  11/1956  Dinsmore _____ 74—98

BROUGHTON G. DURHAM, *Primary Examiner.*